United States Patent
Yamaguchi (10) Patent No.: US 9,501,020 B2
(45) Date of Patent: Nov. 22, 2016

(54) IMAGE FORMING APPARATUS THAT USES A PLANETARY GEAR MECHANISM TO CHANGE A ROTATION DIRECTION OF ROLLERS

(71) Applicant: Brother Kogyo Kabushiki Kaisha, Nagoya-shi, Aichi-ken (JP)

(72) Inventor: Wataru Yamaguchi, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/839,050

(22) Filed: Aug. 28, 2015

(65) Prior Publication Data

US 2016/0061295 A1    Mar. 3, 2016

(30) Foreign Application Priority Data

Aug. 29, 2014 (JP) ................................. 2014-175104

(51) Int. Cl.
| | |
|---|---|
| *G03G 15/00* | (2006.01) |
| *F16D 27/112* | (2006.01) |
| *G03G 15/23* | (2006.01) |
| *G03G 21/16* | (2006.01) |

(52) U.S. Cl.
CPC ......... *G03G 15/6529* (2013.01); *F16D 27/112* (2013.01); *G03G 15/234* (2013.01); *G03G 21/1647* (2013.01); *B65H 2403/481* (2013.01); *G03G 2215/00438* (2013.01)

(58) Field of Classification Search
CPC .......... B65H 2403/481; G03G 15/234; F16H 13/12; F16H 2001/0872; F16H 2001/2881; F16H 2200/2035; F16D 27/04; F16D 27/112

USPC ......................................... 475/326, 327, 328
See application file for complete search history.

(56) References Cited

U.S. PATENT DOCUMENTS

| | | | | |
|---|---|---|---|---|
| 6,788,905 | B2* | 9/2004 | Tsutada | G03G 15/6573 399/396 |
| 8,340,566 | B2* | 12/2012 | Jeong | B65H 5/36 271/301 |
| 8,475,324 | B2* | 7/2013 | Yang | F16H 3/60 475/324 |
| 8,900,088 | B2 | 12/2014 | Yasuda et al. | |
| 2013/0101314 | A1 | 4/2013 | Yasuda et al. | |
| 2013/0237366 | A1 | 9/2013 | Yasuda et al. | |

FOREIGN PATENT DOCUMENTS

| | | |
|---|---|---|
| JP | 2002-003048 A | 1/2002 |
| JP | 2003-035982 A | 2/2003 |

(Continued)

*Primary Examiner* — Justin Olamit
(74) *Attorney, Agent, or Firm* — Banner & Witcoff, Ltd.

(57) ABSTRACT

An image forming apparatus including a driving source, a planetary gear mechanism including first, second and third elements, a rotation restraint member configured to switch the planetary gear mechanism between a locked state where rotation of the second element is locked and a released state where the second element is capable of rotating, and a switching mechanism configured to switch the planetary gear mechanism between a first state where any two elements of the first, second and third elements are separated and a second state where the two elements are coupled, wherein the third element is configured to rotate in a first direction when the planetary gear mechanism is in the locked state and first state and to rotate in a second direction opposite to the first direction when the planetary gear mechanism is in the released state and second state.

4 Claims, 6 Drawing Sheets

(56) References Cited

FOREIGN PATENT DOCUMENTS

| JP | 2007-212806 A | 8/2007 |
| JP | 2007-271858 A | 10/2007 |
| JP | 2009-251349 A | 10/2009 |
| JP | 2010-055055 A | 3/2010 |
| JP | 2011-099896 A | 5/2011 |
| JP | 2011-140980 A | 7/2011 |
| JP | 2011-248071 A | 12/2011 |
| JP | 2013-100896 A | 5/2013 |
| JP | 2013-174632 A | 9/2013 |
| JP | 2013-213574 A | 10/2013 |
| JP | 2014-081632 A | 5/2014 |

* cited by examiner

IMAGE FORMING APPARATUS THAT USES A PLANETARY GEAR MECHANISM TO CHANGE A ROTATION DIRECTION OF ROLLERS

CROSS-REFERENCE TO RELATED APPLICATIONS

This application claims priority from Japanese Patent Application No. 2014-175104 filed on Aug. 29, 2014, the entire contents of which are incorporated herein by reference.

TECHNICAL FIELD

The present disclosure relates to an image forming apparatus including a driving source configured to drive an image forming unit.

BACKGROUND

In related art, an image forming apparatus has been known which includes a driving source that rotates only in one direction and a gear mechanism capable of switching a rotating direction of an output gear, to which a driving force from the driving source is transmitted, between one direction and an other direction opposite to the one direction. The gear mechanism is provided with a pendulum gear capable of transmitting the driving to the output gear. In this configuration, it is possible to change a transmission path to the output gear by swinging the pendulum gear. Thereby, it is possible to change a rotating direction of the output gear.

However, in the related-art image forming apparatus, since it is necessary to secure a space in an apparatus main body, in which the pendulum gear can swing, it is not possible to achieve space-saving the image forming apparatus.

SUMMARY

It is therefore an object of the present disclosure to provide an image forming apparatus capable of achieving space-saving.

According to an aspect of the present disclosure, there is provided an image forming apparatus including: a driving source configured to drive an image forming unit; a planetary gear mechanism including a first element to which a driving force from the driving source is configured to be input, a second element to which the driving force is configured to be transmitted from the first element, and a third element configured to output the driving force transmitted from the second element; a rotation restraint member configured to switch the planetary gear mechanism between a locked state where rotation of the second element is locked and a released state where the second element is capable of rotating, and a switching mechanism configured to switch the planetary gear mechanism between a first state where any two elements of the first element, the second element and the third element are separated and a second state where the two elements are coupled so as to be able to rotate integrally in a same direction, wherein the first element, the second element and the third element respectively corresponds to a respective one of a sun gear, a carrier and a ring gear, and wherein the third element is configured to rotate in a first direction when the planetary gear mechanism is in the locked state and the first state and to rotate in a second direction opposite to the first direction when the planetary gear mechanism is in the released state and the second state.

BRIEF DESCRIPTION OF DRAWINGS

FIGS. 4A to 4C illustrate operations of the gear mechanism, in which

DETAILED DESCRIPTION

Hereinafter, an illustrative embodiment of the present disclosure will be described in detail with reference to the drawings. Meanwhile, in the descriptions hereinafter, a schematic configuration of a laser printer 1, which is an example of the image forming apparatus, will be described first, and then, the characteristic features of the present disclosure will be described.

Figure 1:
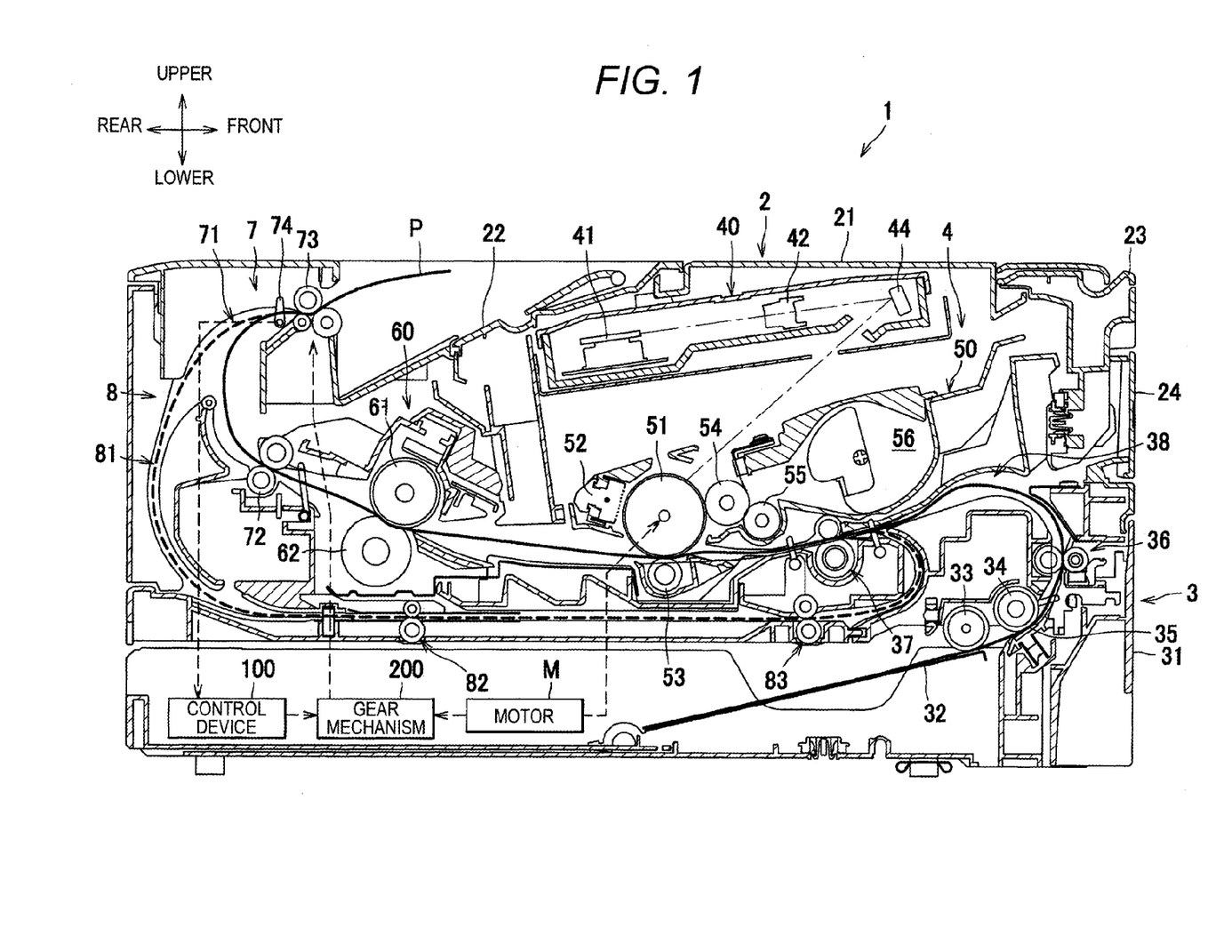
FIG. 1 is a view illustrating a schematic configuration of a laser printer according to an illustrative embodiment.

Meanwhile, in the descriptions hereinafter, the directions are described based on a user who uses the laser printer 1. That is, the right side in FIG. 1 is referred to as 'front', the left side is referred to as 'rear', the front side is referred to as 'left' and the inner side is referred to 'right'. Also, the upper and lower direction in FIG. 1 is referred to as 'upper and lower direction'.

As shown in FIG. 1, the laser printer 1 is configured to form images on both surfaces of a sheet P, and mainly includes, in an apparatus main body 2, a feeder unit 3, an image forming unit 4, a discharge unit 7, a reversing unit 8, a control device 100, a gear mechanism 200 and a motor M, which is an example of the driving source.

The apparatus main body 2 is provided at its front side with a front cover 23 that is opened when attaching and detaching a process cartridge 50. A manual feeding tray 24 for placing thereon the sheet P inserted by a hand is rotatably provided to the front cover 23.

The feeder unit 3 is configured to feed the sheet P to the image forming unit 4 and is provided at a lower part in the apparatus main body 2. The feeder unit 3 is mainly configured by a sheet feeding tray 31, a sheet pressing plate 32, a pickup roller 33, a separation roller 34, a separation pad 35, a pair of conveying rollers 36, a pair of register rollers 37 and a feed path 38.

The feed path 38 is a path for conveying the sheet P sent from the sheet feeding tray 31 towards the image forming unit 4, specifically towards between a photosensitive drum 51 and a transfer roller 53. The feed path 38 extends obliquely towards a front-upper side from the vicinity of the pickup roller 33, and then an advancing path thereof is curved rearwards so as to extend towards between the photosensitive drum 51 and the transfer roller 53.

The sheet P placed in the sheet feeding tray 31 is inclined towards the pickup roller 33 by the sheet pressing plate 32 and is sent to the feed path 38 by the pickup roller 33. The sent sheets P are separated one by one by the separation roller 34 and the separation pad 35, which is then conveyed by the pair of conveying rollers 36. Then, the inclining of the sheet P is corrected by the pair of register rollers 37 and is conveyed towards the image forming unit 4.

The image forming unit 4 is configured to form an image on the fed sheet P and is provided above the sheet feeding tray 31. The image forming unit 4 mainly includes an exposure device 40, the process cartridge 50 and a fixing device 60.

The exposure device 40 is provided at an upper part inside the apparatus main body 2, and mainly includes a laser light emitting unit (not shown), a polygon mirror 41 which can be rotatingly-driven, a lens 42 and a reflector 44. The laser light (see the dashed line) emitted from the laser light emitting unit based on image data is reflected or passes in order of the polygon mirror 41, the lens 42 and the reflector 44 and is then scanned at high speed on a surface of the photosensitive drum 51.

The process cartridge 50 is arranged below the exposure device 40, and mainly includes the photosensitive drum 51, a charger 52, the transfer roller 53, a developing roller 54, a supply roller 55 and a toner accommodation unit 56 that accommodates therein toner.

The fixing device 60 is provided at the rear of the process cartridge 50, and includes a heating roller 61 and a pressing roller 62 arranged to face the heating roller 61 and to press the heating roller 61.

In the image forming unit 4, a surface of the photosensitive drum 51 is uniformly charged by the charger 52 and is then exposed by the high-speed scanning of the laser light from the exposure device 40, so that an electrostatic latent image is formed on the photosensitive drum 51. Also, the toner in the toner accommodation unit 56 is supplied to the developing roller 54 via the supply roller 55 and is then carried on the developing roller 54.

The toner carried on the developing roller 54 is supplied to the electrostatic latent image on the photosensitive drum 51, so that the electrostatic latent image becomes visible and a toner image is thus formed on the photosensitive drum 51. Thereafter, the sheet P fed from the feeder unit 3 is conveyed between the photosensitive drum 51 and the transfer roller 53, so that the toner image on the photosensitive drum 51 is transferred to the sheet P. Then, the sheet P is conveyed between the heating roller 61 and the pressing roller 62, so that the toner image transferred to the sheet P is heat-fixed.

The discharge unit 7 is configured to convey the sheet P having the toner image heat-fixed thereon towards an outside of the apparatus main body 2, and mainly includes a discharge path 71, a conveying roller 72 and a switchback roller 73.

The discharge path 71 is a path for guiding the sheet P carried out from the fixing device 60 towards a sheet discharge tray 22 while bending the same.

The switchback roller 73 is provided in the vicinity of an exit of the discharge path 71, and is configured to rotate in forward and backward directions under control of the control device 100. Specifically, the switchback roller 73 is configured to discharge the sheet P towards an outside of the apparatus main body 2 upon the forward rotation, and to convey the sheet P to the reversing unit 8 upon the backward rotation.

Also, a sheet passing sensor 74 that detects whether the sheet P has passed or not is provided at the rear of the switchback roller 73. The sheet passing sensor 74 is configured to be swingable in the front and rear direction. When the sheet P contacts the sheet passing sensor, the sheet passing sensor 74 swings in the front and rear direction, thereby detecting the passing of the sheet P.

In the discharge unit 7, the sheet P (see the solid line) having an image formed thereon and discharged from the image forming unit 4 is conveyed towards the switchback roller 73 while bending the advancing path thereof from a rear-upper direction to a front direction. When an operation of forming an image on one surface or images on both surfaces is completed, the sheet P is discharged to the sheet discharge tray 22 arranged at the upper part of the apparatus main body 2.

Meanwhile, when forming images on both surfaces, the sheet P is first conveyed towards the outside of the apparatus main body 2 by the switchback roller 73 rotating in the forward direction. Before the entire sheet P is discharged to the outside of the apparatus main body 2, the switchback roller 73 is rotated in the backward direction, so that the sheet P is again introduced into the apparatus main body 2 and conveyed to the reversing unit 8 (see the dotted line).

The reversing unit 8 is configured to convey the sheet P of which surface and back surface have been reversed towards the image forming unit 4 again when forming images on both surfaces of the sheet P. The reversing unit 8 mainly has a re-conveyance path 81 and a pair of re-conveying rollers 82, 83.

The re-conveyance path 81 is a path for guiding the sheet P of which one surface has been formed with an image towards the feed path 38 by the backward rotation of the switchback roller 73. More specifically, the re-conveyance path 81 is branched from the vicinity of a rear end of the discharge path 71, extends downwards, the advancing path thereof is curved forwards, extends forwards from the rear side above the sheet feeding tray 31, the advancing path thereof is further curved upwards, and U-turns towards and joins at a joining position of the feed path 38.

In the reversing unit 8, the sheet P (see the dotted line) conveyed by the backward rotation of the switchback roller 73 is conveyed through the re-conveyance path 81, is again sent to the feed path 38 and is then conveyed to the image forming unit 4. Thereafter, the sheet P (see the solid line) is formed on its back surface with an image in the image forming unit 4, is discharged to the outside of the apparatus main body 2 by the discharge unit 7 and is then placed on the sheet discharge tray 22.

Subsequently, the gear mechanism 200 is described.

Figure 2:
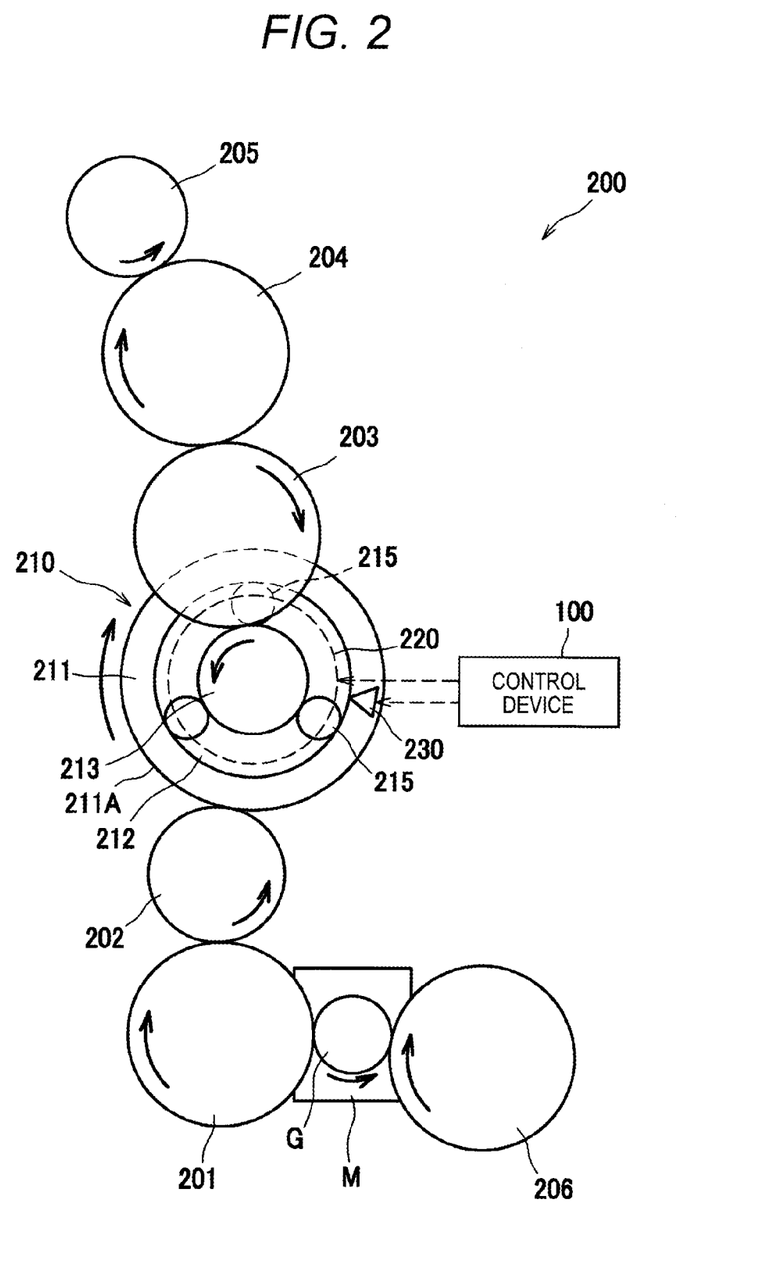
FIG. 2 illustrates an overall gear mechanism in a locked state and a first state.

As shown in FIG. 2, the gear mechanism 200 is a mechanism configured by a plurality of gears and transmits a driving force generated from the motor M to the switchback roller 73. The gear mechanism 200 includes a first driving force input gear 201, a transmission gear 202, a planetary gear mechanism 210, an electromagnetic clutch 220, which is an example of the switching mechanism, a rotation restraint member 230, a first intermediate gear 203, a second intermediate gear 204 and a switchback roller gear 205.

The first driving force input gear 201 is a gear that meshes with a driving gear G rotating integrally with a rotary shaft of the motor M. In this illustrative embodiment, the driving gear G is also meshed with a second driving force input gear 206. The second driving force input gear 206 is a gear for transmitting the driving force to the image forming unit 4 such as the photosensitive drum 51 through a plurality of gear trains (not shown).

The transmission gear 202 is a gear that meshes with the first driving force input gear 201 and transmits the driving force of the motor M to the planetary gear mechanism 210.

The first intermediate gear 203 is a gear connected to the planetary gear mechanism 210, the second intermediate gear 204 is a gear that meshes with the first intermediate gear 203 and the switchback roller 205, and the switchback roller 205 is a gear that rotates integrally with the switchback roller 73.

Figure 3A:
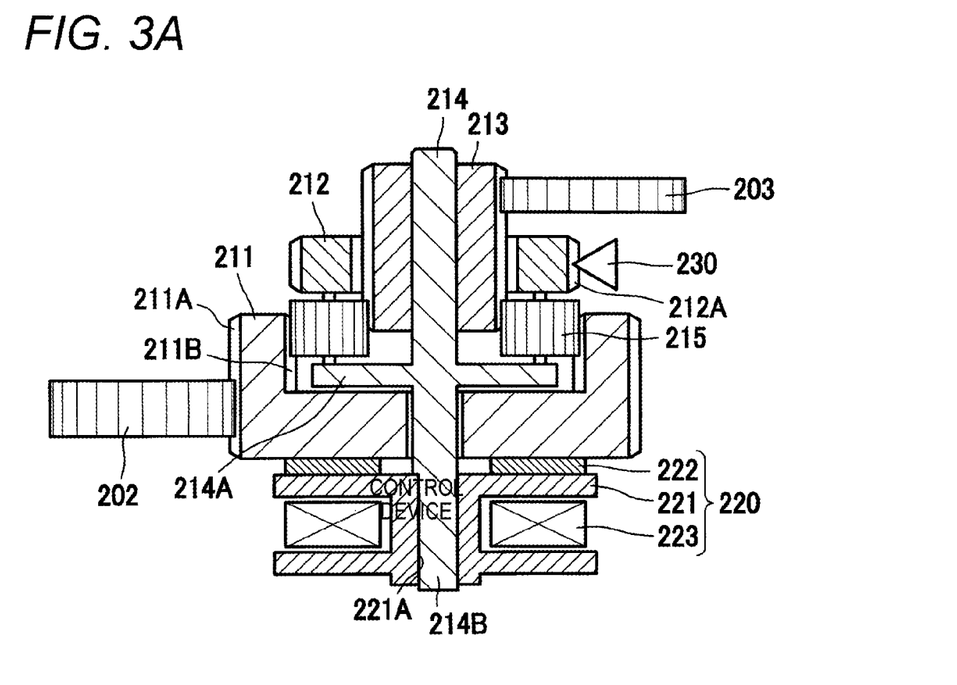
FIG. 3A is a sectional view of a planetary gear mechanism taken along a center of rotation of a planetary gear mechanism.

The planetary gear mechanism 210 is a gear mechanism including three elements of a ring gear 211, which is an example of the first element, a carrier 212, which is an example of the second element, and a sun gear 213, which is an example of the third element. As shown in FIG. 3A, the ring gear 211, the carrier 212 and the sun gear 213 are configured to be rotatable about an axis line of a rotary shaft 214. That is, the ring gear 211, the carrier 212 and the sun gear 213 have the same rotation axis line.

The ring gear 211 has external teeth 211A provided on an outer periphery thereof and internal teeth 211B provided on an inner periphery thereof. The ring gear 211 is configured so that the external teeth 211A are meshed with the transmission gear 202 and the driving force from the motor M is transmitted to the external teeth 211A.

The carrier 212 has a ring shape of which a diameter is smaller than an outer diameter of the ring gear 211, and has external teeth 212A provided on an outer periphery thereof. The carrier 212 is supported by a support part 214A extending from the rotary shaft 214 in a diametrically outward direction. For this reason, the carrier 212 is configured to rotate integrally with the rotary shaft 214.

The carrier 212 rotatably supports three pinion gears 215, which meshes with the internal teeth 211B of the ring gear 211, between the carrier 212 and the support part 214A (see FIG. 2). For this reason, the carrier 212 is configured so that the driving force from the ring gear 211 is transmitted thereto through the pinion gears 215.

The sun gear 213 is configured so that it passes through along an inner periphery of the carrier 212, external teeth thereof are meshed with the three pinion gears 215 and the driving force from the ring gear 211 is transmitted thereto through the pinion gears 215. The sun gear 213 is connected to the first intermediate gear 203 and is configured so that the driving force from the motor M transmitted through the pinion gears 215 is output to the first intermediate gear 203. For this reason, an output from the sun gear 213 is transmitted to the switchback roller gear 205, i.e., the switchback roller 73 through the first intermediate gear 203 and the second intermediate gear 204.

The electromagnetic clutch 220 includes a moveable iron core 221, a fixed iron core 222 and a coil 223. The moveable iron core 221 is arranged at a side of the ring gear 211 opposite to the sun gear 213 and is configured to be moveable relative to the coil 223 fixed to the apparatus main body 2.

Figure 3B:
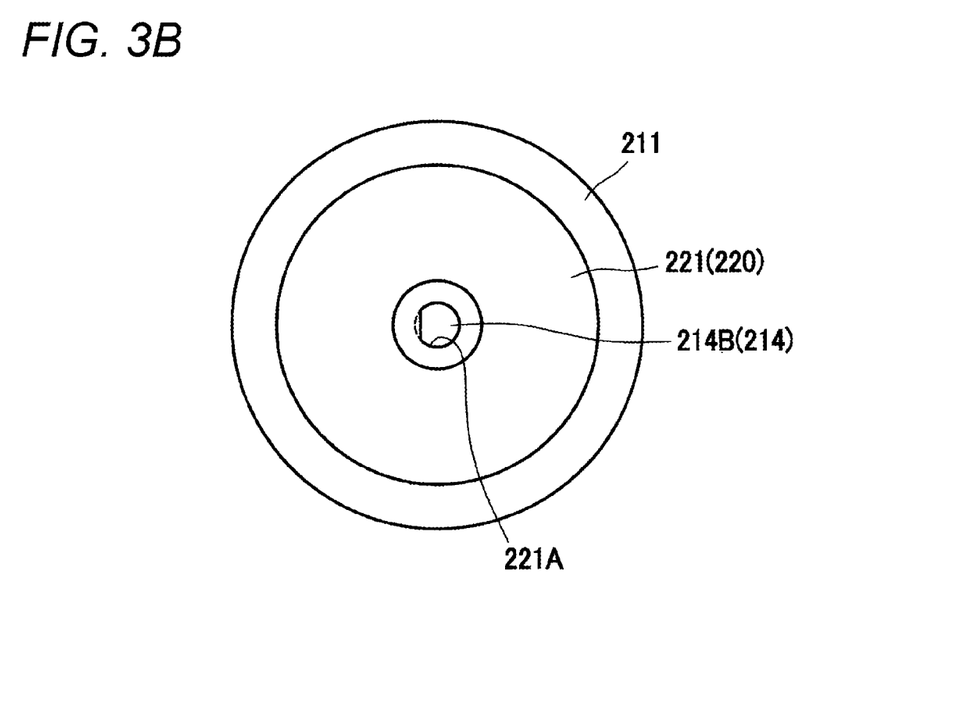
FIG. 3B is a view illustrating the planetary gear mechanism, as seen from an electromagnetic clutch-side.

As shown in FIG. 3B, the moveable iron core 221 has a hole 221A having a substantially D-shaped section, which can be engaged with an engaging part 214B having a substantially D-shaped section and formed at a tip portion of the rotary shaft 214, and is engaged with the rotary shaft 214. For this reason, the moveable iron core 221 can rotate integrally with the carrier 212 through the rotary shaft 214.

The fixed iron core 222 is fixed to an end surface of the ring gear 211 facing the moveable iron core 221. For this reason, when the coil 223 is energized, the moveable iron core 221 is sucked to the fixed iron core 222 by an electromagnetic suction force and is integrated with the ring gear 211. At this time, the ring gear 211 is coupled to the carrier 212 through the electromagnetic clutch 220.

Further, when the coil 223 is not energized, the moveable iron core 221 and the fixed iron core 222 are not sucked and the moveable iron core 221 and the ring gear 211 are not integrated. At this time, the ring gear 211 is separated from the carrier 212.

In this way, the electromagnetic clutch 220 is configured to switch the planetary gear mechanism 210 between a first state where the ring gear 211 and the carrier 212 are separated and a second state where the ring gear 211 and the carrier 212 are coupled.

The rotation restraint member 230 is a member for locking the rotation of the carrier 212, and a tip thereof has a triangular shape capable of being engaged with the external teeth 212A of the carrier 212. The rotation restraint member 230 is moveable between a position (see FIG. 4A) at which it is engaged with the carrier 212 and locks the rotation of the carrier 212 and a position (see FIG. 4B) at which the engagement with the carrier 212 is released.

That is, the rotation restraint member 230 is configured to switch the planetary gear mechanism 210 between a locked state where the rotation of the carrier 212 is locked and a released state where the carrier 212 is capable of rotating. In the meantime, the rotation restraint member 230 is configured to move to the position in the locked state when, for example, a solenoid which is not shown is turned ON and to move to the position in the released state when the solenoid is turned OFF.

Here, operations of the gear mechanism 200 are described with reference to FIGS. 4A and 4B.

Figure 4A:
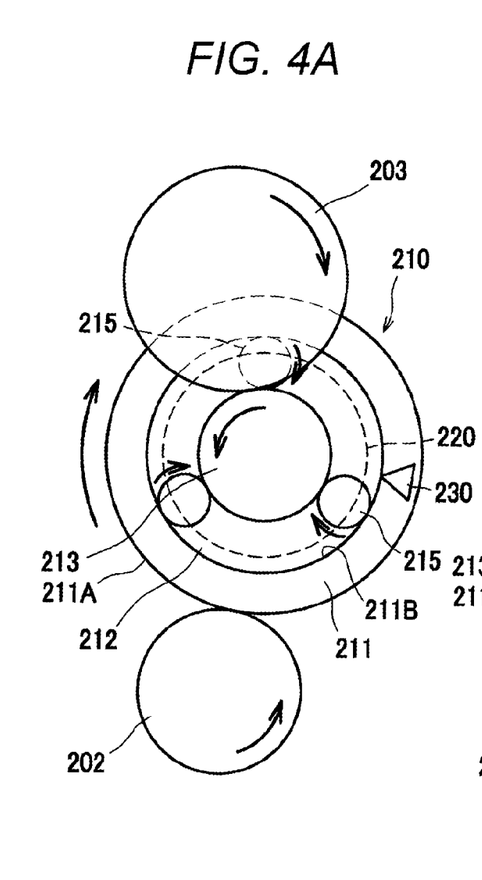
FIG. 4A illustrates an operation in the locked state and the first state.

As shown in FIG. 4A, when the rotation restraint member 230 is in the locked state and the energization to the electromagnetic clutch 220 is OFF, i.e., the electromagnetic clutch 220 is in the first state, the rotation of the carrier 212 is locked and the ring gear 211 is separated from the carrier 212. Therefore, when the driving force is input to the ring gear 211, the ring gear 211 is rotated in the clockwise direction as shown in FIG. 4A, separately from the carrier 212.

At this time, since the carrier 212 is fixed, the pinion gears 215 meshed with the internal teeth 211B of the ring gear 211 are rotated in the clockwise direction shown in FIG. 4A. According to the rotation, the sun gear 213 is rotated in the counterclockwise direction shown in FIG. 4A (one direction).

Figure 4B:
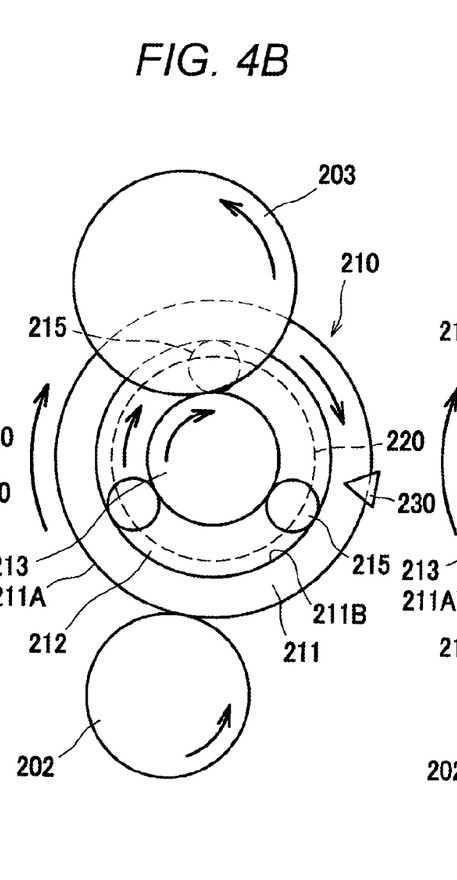
FIG. 4B illustrates an operation in a released state and a second state.

Then, as shown in FIG. 4B, when the rotation restraint member 230 is in the released state and the energization to the electromagnetic clutch 220 is ON, i.e., the electromagnetic clutch 220 is in the second state, the carrier 212 can be rotated and the ring gear 211 is integrated with the carrier 212. Therefore, when the driving force is input to the ring gear 211, the ring gear 211 and the carrier 212 are integrally rotated in the clockwise direction shown in FIG. 4B.

At this time, since the pinion gears 215 move around the sun gear 213 in the clockwise direction shown in FIG. 4B without rotating on its own axis, the sun gear 213 is rotated in the clockwise direction shown in FIG. 4B (other direction) according to the movement.

In this way, the sun gear 213 is configured to rotate in the one direction in the locked state and the first state and to rotate in the other direction opposite to the one direction in the released state and the second state. Thereby, it is possible to switch the rotating direction of the switchback roller 73 between the one direction and the other direction.

Figure 4C:
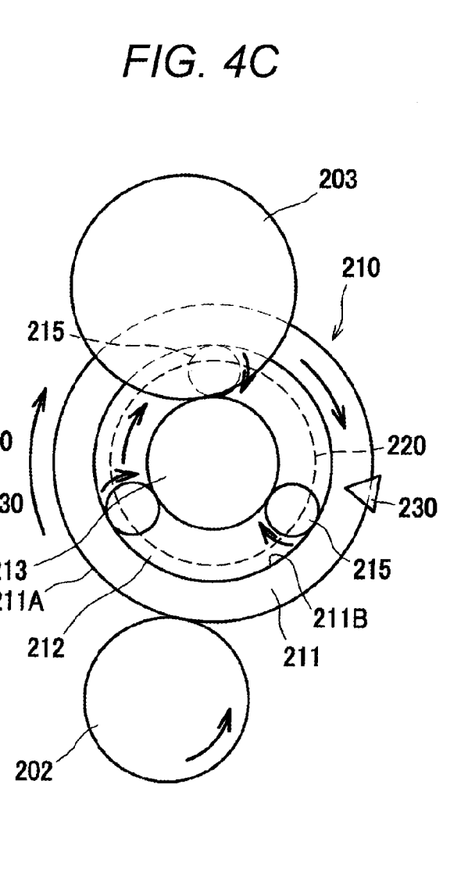
FIG. 4C illustrates an operation in the released state and the first state.

Further, as shown in FIG. 4C, when the rotation restraint member 230 is in the released state and the electromagnetic clutch 220 is in the first state, the carrier 212 can be rotated and the ring gear 211 is separated from the carrier 212. Therefore, when the driving force is input to the ring gear 211, the ring gear 211 is rotated in the clockwise direction shown in FIG. 4C and the carrier 212 is also rotated, according to the rotation.

Specifically, as the ring gear 211 is rotated, the pinion gears 215 meshed with the internal teeth 211B move around the sun gear 213 in the clockwise direction while rotating on its own axis. According to this movement, the carrier 212 is rotated in the clockwise direction shown in FIG. 4C. At this time, since the driving force is not transmitted to the sun gear 213, the sun gear 213 is stopped. For this reason, the switchback roller 73 is configured to stop in the released state and the first state.

Subsequently, the control device 100 is described.

The control device 100 has a CPU, a ROM, a RAM and the like, for example, and is configured to execute calculation processing based on the detection signal of the sheet passing sensor 74, a prepared program and the like, thereby controlling the gear mechanism 200.

The control device 100 executes one direction control of rotating the switchback roller 73 in the one direction, stop control of stopping the switchback roller 73 from rotating in the one direction and other direction control of rotating the stopped switchback roller 73 in the other direction.

The control device 100 executes the one direction control during most of the one-side printing control or duplex printing control (except for the stop control and the other direction control). When executing the one direction control, the control device 100 executes control of setting the locked state and the first state, i.e., the control of setting the solenoid to an ON state, and control of turning off the energization to the electromagnetic clutch 220. Thereby, the locked state and the first state are set and the switchback roller 73 (sun gear 213) is rotated in the one direction.

When executing the stop control, the control device 100 determines whether a predetermined time period has elapsed after a front end portion of the sheet P has passed the position of the switchback roller 73, specifically, the position of the sheet passing sensor 74, upon the one direction control during the duplex printing control and after the one-side printing of the sheet P is over. In the meantime, the predetermined time period is a time period after the front end portion of the sheet P has passed the position of the switchback roller 73 until the sheet P moves to a position at which the sheet P is not discharged from the switchback roller 73, and can be set to an appropriate value by taking into consideration a length of the sheet P and the like.

When the predetermined time period elapses, the control device 100 executes control of switching the locked state to the released state, i.e., switching the solenoid from the ON state to the OFF state. Thereby, since the released state and the first state are set and the switchback roller 73 (sun gear 213) is stopped, it is possible to adjust a timing of the switchback by the switchback roller 73.

When executing the other direction control, the control device 100 determines whether a constant time period has elapsed upon the execution of the stop control. In the meantime, the constant time period is a time period for which the switchback roller 73 is stopped, and can be set to an appropriate time.

When the constant time period has elapsed, the control device 100 executes control of switching the first state to the second state, i.e., control of switching the energization to the electromagnetic clutch 220 from the OFF state to the ON state. Thereby, the released state and the second state are set and the switchback roller 73 (sun gear 213) is rotated in the other direction.

Then, the control device 100 executes control of switching the other direction control to the one direction control. More specifically, upon the execution of the other direction control, the control device 100 determines whether a rear end of the sheet P has passed the position of the switchback roller 73. Specifically, the control device 100 determines whether the rear end of the sheet P has passed the position of the sheet passing sensor 74. When the sheet P passes the position of the sheet passing sensor 74, i.e., the sheet passing sensor 74 returns from a tilted state to an original state, the control device 100 executes control of switching the control to the one direction control. Thereby, the switchback roller 73 is rotated in the one direction and the sheet P to which the duplex printing has been completed is discharged to the sheet discharge tray 22.

Figure 5:
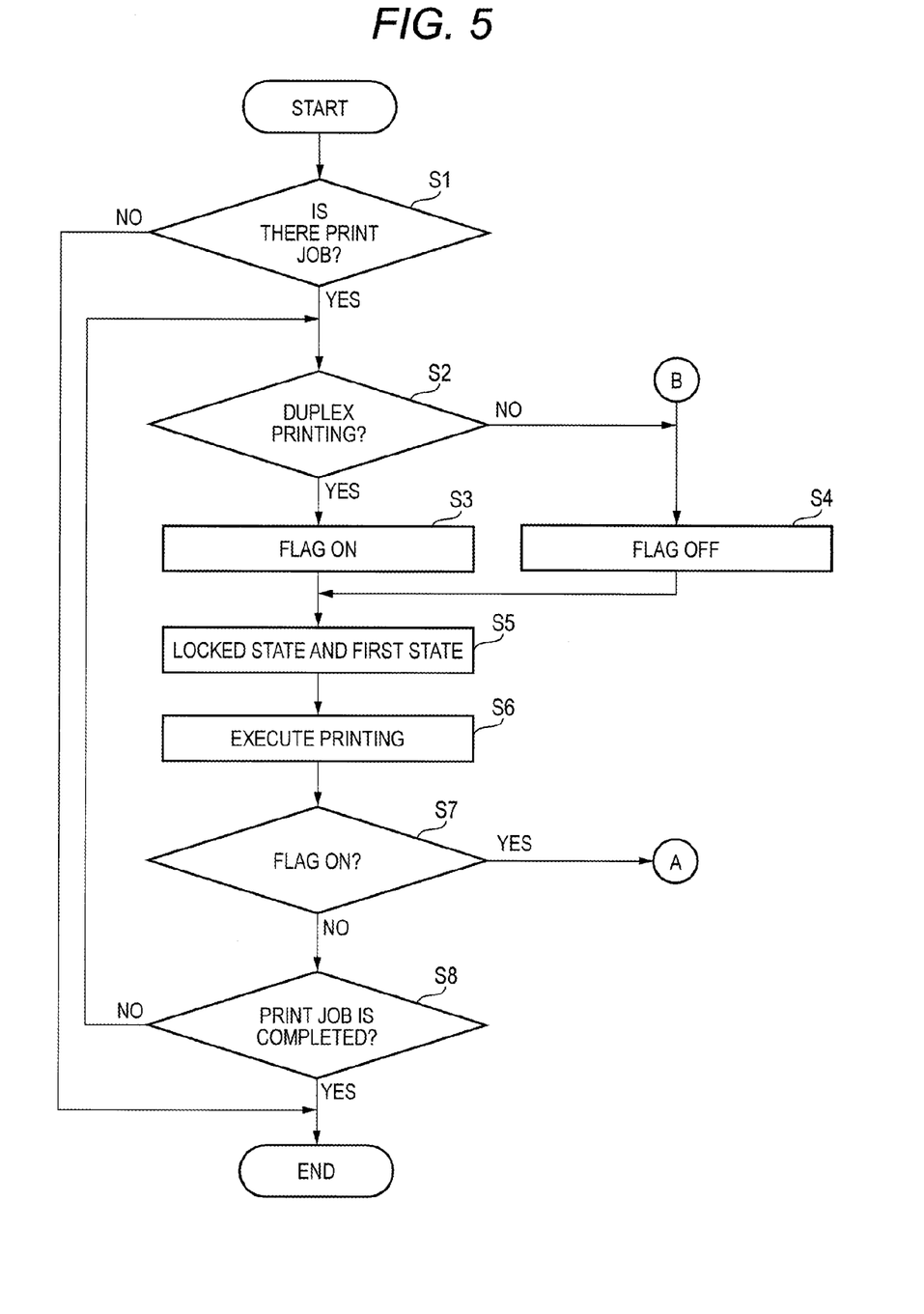
FIG. 5 is a flowchart showing operations of a control device.
Figure 6:
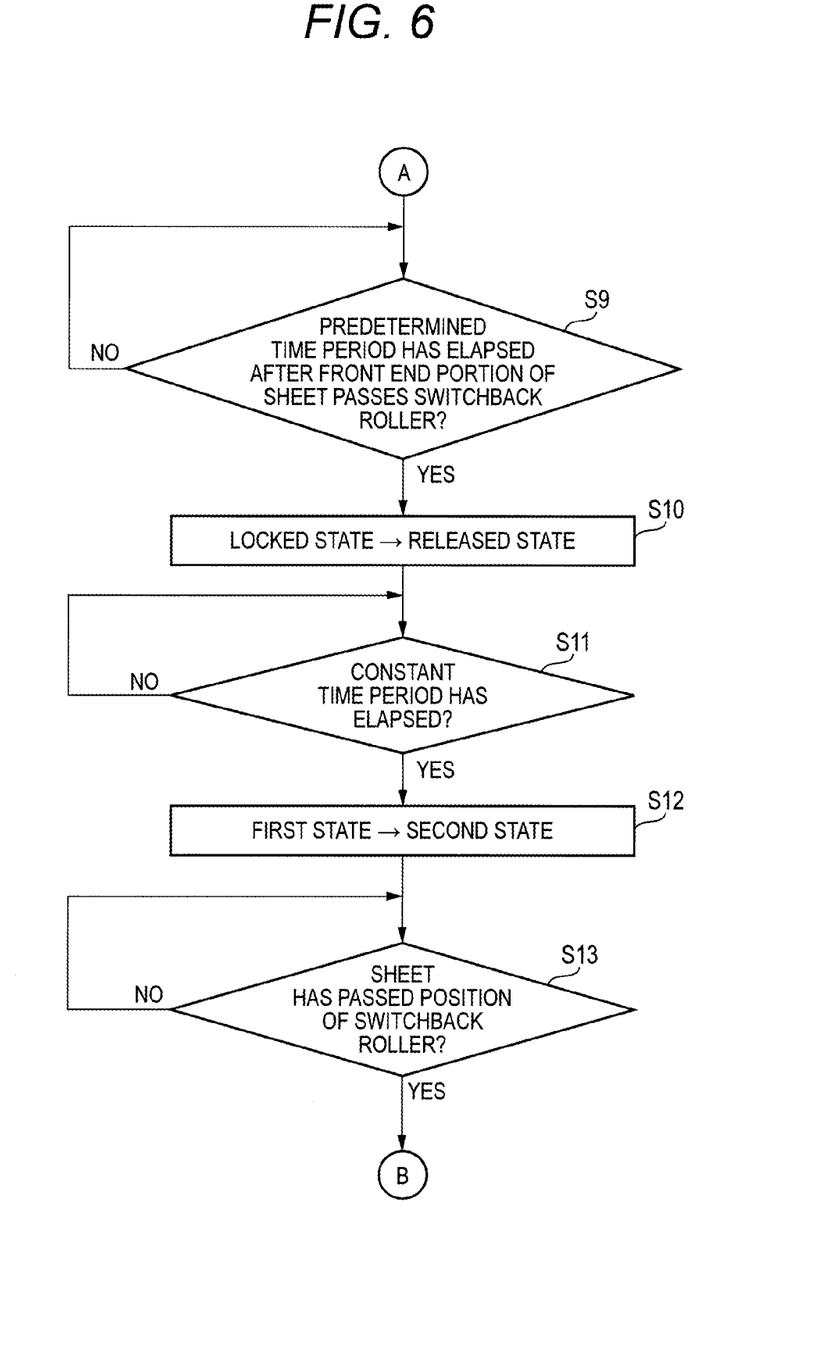
FIG. 6 is a flowchart showing operations of the control device.

The control device 100 configured as described above executes the control in accordance with flowcharts shown in FIGS. 5 and 6.

As shown in FIG. 5, the control device 100 determines whether there is a print job (S1). In step S1, when it is determined that there is no print job (S1: No), the control device 100 ends the control, and when it is determined there is a print job (S1: Yes), the control device 100 determines whether the print job is a duplex printing (S2).

In step S2, when the print job is a duplex printing (S2: Yes), the control device 100 sets a flag to ON (S3), and when the print job is not a duplex printing (S2: No), the control device 100 sets the flag to OFF (S4). After step S3 or S4, the control device 100 sets the locked state and the first state (S5) and executes the printing (S6).

After step S6, the control device 100 determines whether the flag is ON or not (S7). When the flag is OFF (S7: No), the control device 100 determines whether the print job is completed (S8). In step S8, when the print job is not completed (S8: No), the control device 100 repeats the processing from S2, and when the print job is completed (S8: Yes), the control device 100 ends the control.

In step S7, when the flag is ON (S7: Yes), the control device 100 determines whether the predetermined time period has elapsed after the front end portion of the sheet P has passed the position of the switchback roller 73, i.e., the position of the sheet passing sensor 74 (S9), as shown in FIG. 6. In step S9, when the predetermined time period has not elapsed (S9: No), the control device 100 repeats the processing of step S9, and when the predetermined time period has elapsed (S9: Yes), the control device 100 switches the locked state to the released state (S10).

After step S10, the control device 100 determines whether the constant time period has elapsed (S11). In step S11, when the constant time period has not elapsed (S11: No), the control device 100 repeats the processing of step S11, and when the constant time period has elapsed (S11: Yes), the control device 100 switches the first state to the second state (S12).

After step S12, the control device 100 determines whether the rear end of the sheet P has passed the position of the switchback roller 73 (S13). When it is determined that the rear end of the sheet P has not passed the position (S13: No), the control device 100 repeats the processing of step S13, and when it is determined that the rear end of the sheet P has passed the position (S13: Yes), the control device 100 returns to the processing of step S4 and repeats the processing thereafter, as shown in FIG. 5.

The operational effects of the laser printer 1 configured as described above will be described.

When a user turns on the laser printer 1 and instructs a duplex printing, the control device 100 sets the locked state and the first state and executes the one-side printing control of the sheet P. At this time, the switchback roller 73 is rotated in the one direction. When one surface of the sheet P is printed and the predetermined time period has elapsed after the sheet P passes the position of the switchback roller 73, the control device 100 switches the locked state to the released state and the switchback roller 73 is stopped. At this time, the sheet P is stopped at the position at which the sheet is not discharged from the switchback roller 73.

When the constant time period has elapsed from the stop of the switchback roller 73, the control device 100 switches the first state to the second state and the switchback roller 73 is rotated in the other direction. At this time, the sheet P is returned into the apparatus main body 2 and is conveyed towards the re-conveyance path 81. When the rear end of the sheet P has passed the position of the switchback roller 73, the control device 100 again switches the states to the locked state and the first state and executes the back surface printing control of the sheet P. In this way, it is possible to switch the rotating direction of the switchback roller 73 between the one direction and the other direction without switching the rotating direction of the motor M.

Incidentally, in a case where the rotating direction of the motor configured to drive the switchback roller is only the one direction, when a configuration having a gear mechanism configured to swing a pendulum gear and to switch a transmission path to the switchback roller gear is adopted, it is necessary to secure a space for swinging the pendulum gear in the apparatus main body, so that the laser printer may be enlarged.

However, according to the illustrative embodiment, the energization of the electromagnetic clutch 220 is turned ON/OFF to switch the state between the first state and the second state, and the solenoid is turned ON/OFF to switch the carrier 212 between the locked state and the released state. Therefore, it is possible to switch the rotating direction of the sun gear 213 without using the pendulum gear. For this reason, it is possible to achieve space-saving of the laser printer 1.

Also, by switching the rotating direction of the sun gear 213 between the one direction and the other direction, it is possible to implement the switchback without changing the rotating direction of the motor M.

Although the illustrative embodiment of the present disclosure has been described, the present disclosure is not limited to the above illustrative embodiment. The detailed configuration can be appropriately changed without departing from the gist of the present disclosure.

In the above illustrative embodiment, the ring gear 211, the carrier 212 and the sun gear 213 have been exemplified as the first element, the second element and the third element, respectively. However, the present disclosure is not limited thereto and can be appropriately changed depending on the illustrative embodiments. For example, the sun gear may be the first element, the carrier may be the second element, and the ring gear may be the third element.

In the above illustrative embodiment, the two elements of the ring gear 211 and the carrier 212 are switched between the first state and the second state. However, the present disclosure is not limited thereto. For example, the carrier and the sun gear or the ring gear and the sun gear may be the two elements.

In the above illustrative embodiment, the monochrome laser printer 1 has been exemplified as the image forming apparatus. However, the present disclosure is not limited thereto. For example, the image forming apparatus may be other image forming apparatuses such as a copier.

The present disclosure provides illustrative, non-limiting aspects as follows:

According to an aspect, there is provided an image forming apparatus including: a driving source configured to drive an image forming unit; a planetary gear mechanism including a first element to which a driving force from the driving source is configured to be input, a second element to which the driving force is configured to be transmitted from the first element, and a third element configured to output the driving force transmitted from the second element; a rotation restraint member configured to switch the planetary gear mechanism between a locked state where rotation of the second element is locked and a released state where the second element is capable of rotating, and a switching mechanism configured to switch the planetary gear mechanism between a first state where any two elements of the first element, the second element and the third element are separated and a second state where the two elements are coupled so as to be able to rotate integrally in a same direction, wherein the first element, the second element and the third element respectively corresponds to a respective one of a sun gear, a carrier and a ring gear, and wherein the third element is configured to rotate in a first direction when the planetary gear mechanism is in the locked state and the first state and to rotate in a second direction opposite to the first direction when the planetary gear mechanism is in the released state and the second state.

According to the above configuration, by switching the planetary gear mechanism between the locked state and the released state by the rotation restraint member and switching the planetary gear mechanism between the first state and the second state by the switching mechanism, the rotating direction of the third element can be switched between the one direction (first direction) and the other direction (second direction). For this reason, it is not necessary to provide a gear mechanism using a pendulum gear in an apparatus main body, so that it is possible to achieve space-saving of the image forming apparatus.

In the above-described configuration, the switching mechanism may be an electromagnetic clutch.

In the above-described configuration, the second element may be the carrier and may be configured to rotatably support a plurality of pinion gears. The first element may be the ring gear and may include external teeth to which the driving force is configured to be input and internal teeth configured to mesh with the pinion gears. The first element may be one of the sun gear and the ring gear, and the third element may be an other of the sun gear and the ring gear. The first element may be configured to rotate integrally with the second element when the planetary gear mechanism is in the released state and the second state.

In the above-described configuration, the third element may be the sun gear and may be configured to mesh with the pinion gears. The first element may be configured to rotate separately from the second element when the planetary gear mechanism is in the locked state and the first state.

In the above-described configuration, the image forming apparatus may further include a switchback roller configured to switch back a sheet. The output from the third element may be configured to be transmitted to the switchback roller.

According to the above configuration, by switching the rotating direction of the third element between the one direction and the other direction, it is possible to implement the switchback without changing a rotating direction of the driving source.

In the above-described configuration, the image forming apparatus may further include a control device configured to, when adjusting a timing of the switchback by the switchback roller, stop the switchback roller by controlling the planetary gear mechanism to be in the released state and the first state.

In the above-described configuration, the third element may be configured to rotate in the first direction when the planetary gear mechanism is in the locked state and the first state and the first element is rotating in a third direction, and to rotate in the second direction opposite to the first direction when the planetary gear mechanism is in the released state and the second state and the first element is rotating in the third direction.

According to the present disclosure, it is possible to achieve space-saving of the image forming apparatus.

What is claimed is:

1. An image forming apparatus comprising:
    a driving source configured to drive an image forming unit;
    a planetary gear mechanism including: a ring gear to which a driving force from the driving source is configured to be input; a carrier to which the driving force is configured to be transmitted from the ring gear and configured to rotatably support a plurality of pinion gears; and a sun gear configured to output the driving force transmitted from the carrier and configured to mesh with the pinion gears, the ring gear including external teeth to which the driving force is configured to be input and internal teeth configured to mesh with the pinion gears, and the ring gear, the carrier and the sun gear being configured to be rotatable about an axis line of a rotary shaft;
    a rotation restraint member configured to switch the planetary gear mechanism between a locked state where rotation of the carrier is locked and a released state where the carrier is capable of rotating; and
    an electromagnetic clutch configured to switch the planetary gear mechanism between a first state where the electromagnetic clutch separates the ring gear and the carrier along an axial direction of the axis line of the rotary shaft and a second state where the electromagnetic clutch couples the ring gear and the carrier so as to be able to rotate integrally in a same direction about the axis line of the rotary shaft,
    wherein the sun gear is configured to rotate in a first direction when the planetary gear mechanism is in the locked state and the first state and to rotate in a second direction opposite to the first direction when the planetary gear mechanism is in the released state and the second state.

2. The image forming apparatus according to claim 1, further comprising a switchback roller configured to switch back a sheet,
    wherein the output from the sun gear is configured to be transmitted to the switchback roller.

3. The image forming apparatus according to claim 2, further comprising a control device configured to, when adjusting a timing of the switchback by the switchback roller, stop the switchback roller by controlling the planetary gear mechanism to be in the released state and the first state.

4. The image forming apparatus according to claim 1,
    wherein the sun gear is configured to rotate in the first direction when the planetary gear mechanism is in the locked state and the first state and the ring gear is rotating in a third direction, and to rotate in the second direction opposite to the first direction when the planetary gear mechanism is in the released state and the second state and the ring gear is rotating in the third direction.

* * * * *